(12) United States Patent
Pope et al.

(10) Patent No.: US 7,496,699 B2
(45) Date of Patent: Feb. 24, 2009

(54) DMA DESCRIPTOR QUEUE READ AND CACHE WRITE POINTER ARRANGEMENT

(75) Inventors: Steve L. Pope, Cambridge (GB); Derek Roberts, Cambridge (GB); David Riddoch, Cambridge (GB); Ching Yu, Santa Clara, CA (US); John Mingyung Chiang, San Jose, CA (US); Der-Ren Chu, San Jose, CA (US)

(73) Assignee: Level 5 Networks, Inc., Sunnyvale, CA (US)

( * ) Notice: Subject to any disclaimer, the term of this patent is extended or adjusted under 35 U.S.C. 154(b) by 514 days.

(21) Appl. No.: 11/156,228

(22) Filed: Jun. 17, 2005

(65) Prior Publication Data

US 2006/0288129 A1    Dec. 21, 2006

(51) Int. Cl.
*G06F 3/00* (2006.01)
*G06F 13/28* (2006.01)
*G06F 12/00* (2006.01)
(52) U.S. Cl. .................... 710/52; 710/22; 711/100
(58) Field of Classification Search .................. None
See application file for complete search history.

(56) References Cited

U.S. PATENT DOCUMENTS

| | | | |
|---|---|---|---|
| 6,334,162 B1 | 12/2001 | Garrett et al. | |
| 6,397,316 B2 | 5/2002 | Fesas, Jr. | |
| 6,567,859 B1 | 5/2003 | Yang et al. | |
| 6,581,113 B1 | 6/2003 | Dwork et al. | |
| 7,307,998 B1 * | 12/2007 | Wang et al. | 370/412 |

FOREIGN PATENT DOCUMENTS

| | | |
|---|---|---|
| WO | WO 94/02891 | 2/1994 |
| WO | WO 2004/025477 | 3/2004 |

OTHER PUBLICATIONS

Riddoch, David et al.; "Distributed Computing With the CLAM Network"; Laboratory for Communications Engineering, Cambridge, England; SIGCOMM 2002, 13 pages.

Mansley, Kieran; "Engineering a User-Level TCP for the CLAN Network"; Laboratory for Communication Engineering, University of Cambridge, Cambridge, England; AGM SIGCOMM Aug. 2003 Workshops, 228-236.

Pratt, Ian et al.; "Arsenic: A User-Accessible Gigabit Ethernet Interface"; Computer Laboratory, University of Cambridge, England; UK Engineering and Physical Sciences Research Councel (EPSRC), Apr. 2001, 11 pages.

PCI Special Interest Group, "PCI Express Base Specification 1.0a", Apr. 15, 2003.

* cited by examiner

*Primary Examiner*—Alan Chen
(74) *Attorney, Agent, or Firm*—Warren S. Wolfeld; Haynes Beffel & Wolfeld LLP (57) ABSTRACT

Method and apparatus for retrieving buffer descriptors from a host memory for use by a peripheral device. In an embodiment, a peripheral device such as a NIC includes a plurality of buffer descriptor caches each corresponding to a respective one of a plurality of host memory descriptor queues, and a plurality of queue descriptors each corresponding to a respective one of the host memory descriptor queues. Each of the queue descriptors includes a host memory read address pointer for the corresponding descriptor queue, and this same read pointer is used to derive algorithmically the descriptor cache write addresses at which to write buffer descriptors retrieved from the corresponding host memory descriptor queue.

24 Claims, 7 Drawing Sheets

DMA DESCRIPTOR QUEUE READ AND CACHE WRITE POINTER ARRANGEMENT

FIELD OF THE INVENTION

The invention relates to virtual network interface devices and other devices that retrieve DMA descriptors from a plurality of descriptor queues in host memory.

DESCRIPTION OF RELATED ART

A typical computer system includes a processor subsystem (including one or more processors), a memory subsystem (including main memory, cache memory, etc.; also sometimes referred to herein as "host memory"), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

When large amounts of data are to be transferred across between the memory subsystem and a peripheral device, it is usually highly inefficient to accomplish this by having the processor subsystem retrieve the data from memory and write it to the peripheral device, or vice-versa. This method occupies an enormous amount of the processor's time and resources, which could otherwise be used to advance other processing jobs. It is typically much more efficient to offload these data transfers to a data transfer DMA engine, which can control the transfers while the processor subsystem works on other jobs. The processing subsystem controls the data transfer DMA engine by issuing DMA commands to it, the commands identifying in one way or another the starting address in either host memory or the peripheral device or both, and the length of the transfer desired. DMA commands are also sometimes referred to herein as DMA descriptors, and the portion of a DMA command that identifies a starting address is sometimes referred to herein as a pointer. As used herein, "identification" of an item of information does not necessarily require the direct specification of that item of information. Information can be "identified" in a field simply by referring to the actual information through one or more layers of indirection, or by identifying one or more items of different information which are together sufficient to determine the actual item of information. For example, a pointer "identifying" a starting address in host memory may specify the entire physical host memory address, or it may specify an address in a larger memory address space which is mapped to a physical address, or it might specify a virtual address which is mapped to a physical address, or it might specify an address in a user address space which is mapped to a physical address in further dependence upon a user ID of some kind, or it may identify in any of these ways an address that is one less or one greater than the actual starting address identified, and so on. In addition, the term "indicate" is used herein to mean the same as "identify".

In various different computer system arrangements, the data transfer DMA engine may be located across a communication channel from the source of the DMA commands. Often this communication channel is the same as the peripheral bus via which the data itself is transferred, but in some systems it could involve a different bus, either instead of or additionally to the peripheral bus. Often it is advantageous to transfer DMA commands to the data transfer DMA engine in bursts rather than individually, especially where the communication channel supports a burst transfer mode. In a burst transfer mode, multiple data units can be transferred based on only a single starting address identification because logic on both sides of the communication channel know and agree on how to increment the address automatically for the second and subsequent data units. If the communication bus is shared by other agents, then bursts can be advantageous even if there is no special burst transfer mode because arbitration delays are reduced.

For the same reasons that it is advantageous to offload data transfers to a data transfer DMA engine, it is often advantageous to also offload DMA command transfers to a command transfer DMA engine. The command transfer DMA engine may be the same as or different from the data transfer DMA engine in different embodiments. In order to use a command transfer DMA engine, the processor subsystem creates a DMA command queue in a memory that is accessible to the processor subsystem without crossing the communication channel. Typically the DMA command queue is created in the memory subsystem. The processor subsystem then programs the command transfer DMA engine to transfer one or more DMA commands, across the communication channel, from the queue to a local memory that is accessible to the data transfer DMA engine without again crossing the communication channel. Typically the programming of the command transfer DMA engine includes, among other things, programming in the host memory address from which the first data transfer DMA command is to be read, the address in the local memory to which the first data transfer DMA command is to be written, and an identification of the length of the transfer. The data transfer DMA engine then reads the DMA commands from the local memory and executes them in a known sequence.

One type of peripheral device that often requires the transfer of large amounts of data between the peripheral device and the memory subsystem is a network interface device. Network interface devices were historically implemented on plug-in cards, and therefore are sometimes referred to as network interface cards (NICs). As used herein, though, a NIC need not be implemented on a card. For instance it could be in the form of integrated circuits (ICs) and connectors fitted directly onto a motherboard, or in the form of macro-cells fabricated on a single integrated circuit chip with other components of the computer system. Since a NIC will typically both transmit and receive data from a network, the processor subsystem may set up two DMA command queues in the memory subsystem, a transmit (TX) DMA command queue identifying data buffers in memory ready for transmit onto the network, and a receive (RX) DMA command queue identifying data buffers in memory that are available to receive data incoming from the network. Since TX and RX buffers are not typically used at even rates, the NIC's local memory may maintain separate TX and RX queues as well.

The command transfer DMA engine needs to know both the host memory address from which the first data transfer DMA command is to be read, the address in the local memory to which the first data transfer DMA command is to be written. If there is only a single DMA command queue and a single local store for storing the retrieved data transfer DMA commands, then the peripheral device need only have storage for two address pointers to implement the retrieval of data transfer commands by DMA: the host memory address from which the first data transfer DMA command is to be read (a read pointer), and the address in the local memory to which the first data transfer DMA command is to be written (a write pointer). The storage space required to implement these two pointers is not a stretch in modern technologies. In the NIC situation described above there are two host memory queues and two local stores for storing retrieved data transfer DMA commands, so in this situation storage for four address pointers is needed.

Some NICs implement multiple, e.g. up to about 8 or 16, physical network ports. For these NICs, it may be desirable to implement a separate pair of queues in host memory for each physical port, and a corresponding pair of local stores for each physical port. In this situation storage for up to about 16 or 32 address pointers might be needed. This requirement is still not exorbitant, but still it would be desirable to reduce the size of this address pointer storage to reduce space utilization if possible.

U.S. patent application Ser. No. 11/050,476, filed Feb. 3, 2005, entitled "Interrupt Management for Multiple Event Queues" and U.K. Patent Application No. GB0408876A0, filed Apr. 21, 2004, entitled "User-level Stack", both incorporated herein by reference, both describe architectures in which the operating system supports numerous protocol stacks, each with its own set of transmit and receive data structures, and all assisted by functions performed in hardware on the NIC. The number of transmit and receive data queues can number in the thousands, with a corresponding number of local stores for storing retrieved data transfer DMA commands. Many thousands of address pointers are required in such an architecture, occupying significant space on an integrated circuit chip. For example, with 4 k TX DMA command queues and 4 k TX DMA command queues, and a corresponding number (8 k) local stores for storing retrieved data transfer DMA commands, storage is required on the NIC for 8 k read pointers and 8 k write pointers. If each local store requires 7 bits to uniquely address each entry (i.e. the store can hold 128 entries), then storage for 56 k bits are required just to hold the write pointers.

Accordingly, it would be greatly desirable to be able to reduce the amount of space required on an integrated circuit chip for holding address pointers for a DMA engine used to retrieve data transfer DMA commands from queues in host memory to local look-ahead command memories. This can be accomplished by, roughly described, implementing a mechanism for deriving write addresses into the local store algorithmically from the read pointer for the corresponding DMA command queue in host memory, instead of maintaining a separate write pointer for each local store.

BRIEF DESCRIPTION OF THE DRAWINGS

The invention will be described with respect to specific embodiments thereof, and reference will be made to the drawings, in which:

FIG. 3 is a flowchart example of steps that an application process might follow in the system of FIGS. 1 and 2 for the creation and transmission of IP packets onto a network.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
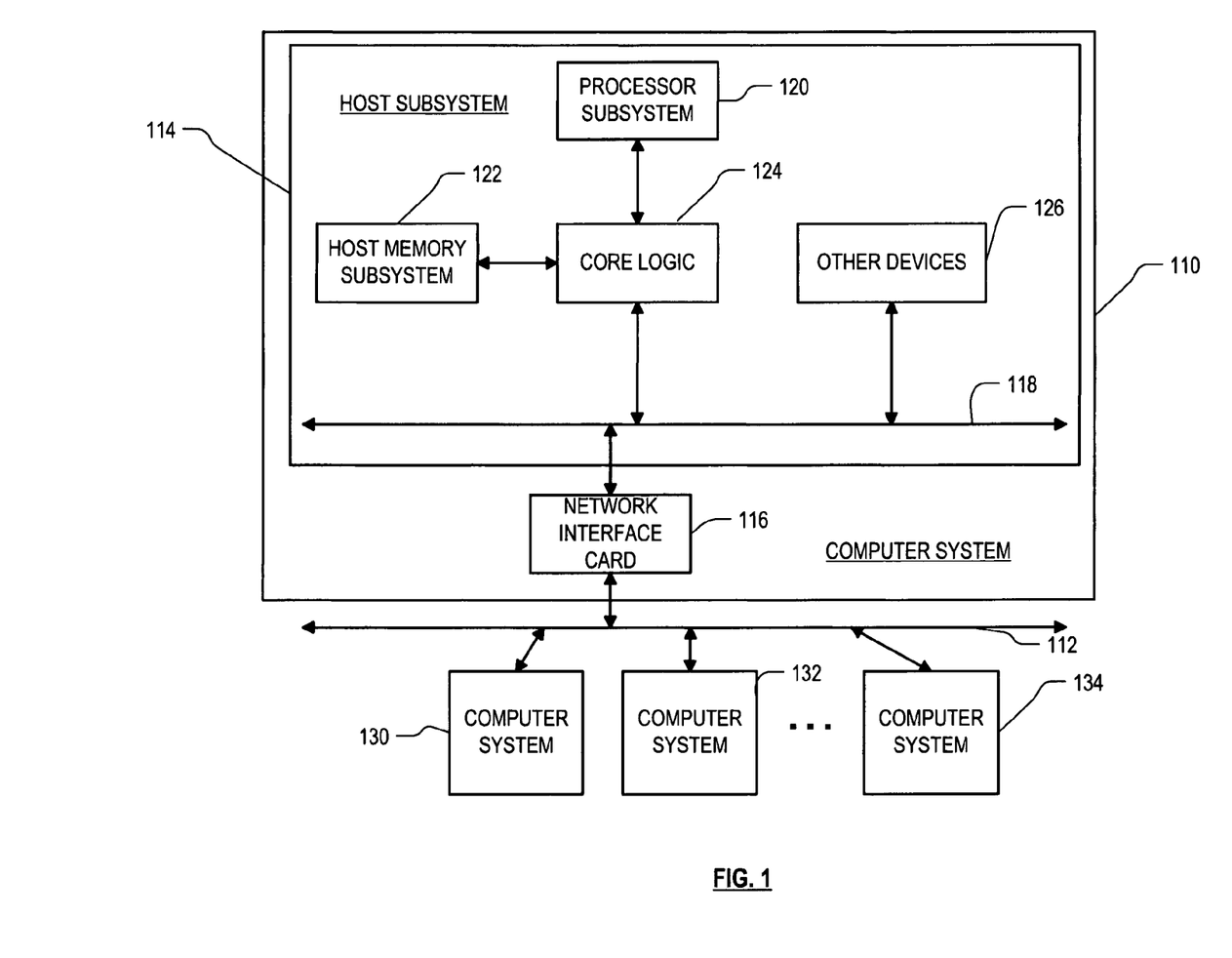
FIG. 1 is a simplified block diagram of a typical computer system incorporating features of the invention.

FIG. 1 is a simplified block diagram of a typical computer system 110 which can communicate via a network 112 with other computer systems such as 130, 132 and 134. Computer system 110 includes a network interface card (NIC) 116 communicating via a communication channel 118 with a host subsystem 114. The host subsystem 124 includes a processor subsystem 120 which includes at least one processor, a host memory subsystem 122, and a core logic subsystem 124. The core logic subsystem 124 provides bridges among the processor subsystem 120, the host memory subsystem 122 and the communication channel 118. The host subsystem 114 may also include other devices 126 in communication with the communication channel 118. As used herein, the host subsystem 114 is considered to be one type of "computing device". Other types of computing devices include non-reconfigurable processing devices for which network connectivity is desired.

The network interface card 116 provides an interface to outside networks, including an interface to the network 112, and is coupled via network 112 to corresponding interface devices in other computer systems.

Network 112 may comprise many interconnected computer systems and communication links. These communication links may be wireline links, optical links, wireless links or any other mechanism for communication of information. While in one embodiment network 112 is the Internet, in other embodiments, network 112 may be any suitable computer network or combination of networks. In and embodiment described herein, network 112 supports an Ethernet protocol.

Host memory subsystem 122 typically includes a number of memories including a main random access memory (RAM) for storage of instructions and data during program execution, and a read only memory (ROM) in which fixed instructions and data are stored. One or more levels of cache memory may also be included in the host memory subsystem 122. For simplicity of discussion, the host memory subsystem 122 is sometimes referred to herein simply as "host memory". As used herein, virtual memory is considered part of the host memory subsystem even though part of it may be stored physically at various times on a peripheral device.

The communication channel 118 provides a mechanism for allowing the various components and subsystems of computer system 110 to communicate with each other. In one embodiment the communication channel 118 comprises a PCI Express bus. Other embodiments may include other buses, and may also include multiple buses. The PCI bus and its progeny, including the version known as PCI Express, support burst transfer protocols such as that described above. PCI express is described in PCI Special Interest Group, "PCI Express Base Specification 1.0a", Apr. 15, 2003, incorporated herein by reference.

Computer system 110 itself can be a varying types including a personal computer, a portable computer, a workstation, a computer terminal, a network computer, a television, a mainframe, a server or any other data processing system or user devices. Due to the ever-changing nature of computers and networks, the description of computer system 110 depicted in FIG. 1 is intended only as a specific example for purposes of illustrating an embodiment of the present invention. Many other configurations of computer system 110 are possible having more or less components, and configured similarly or differently than, the computer system depicted in FIG. 1.

Figure 2:
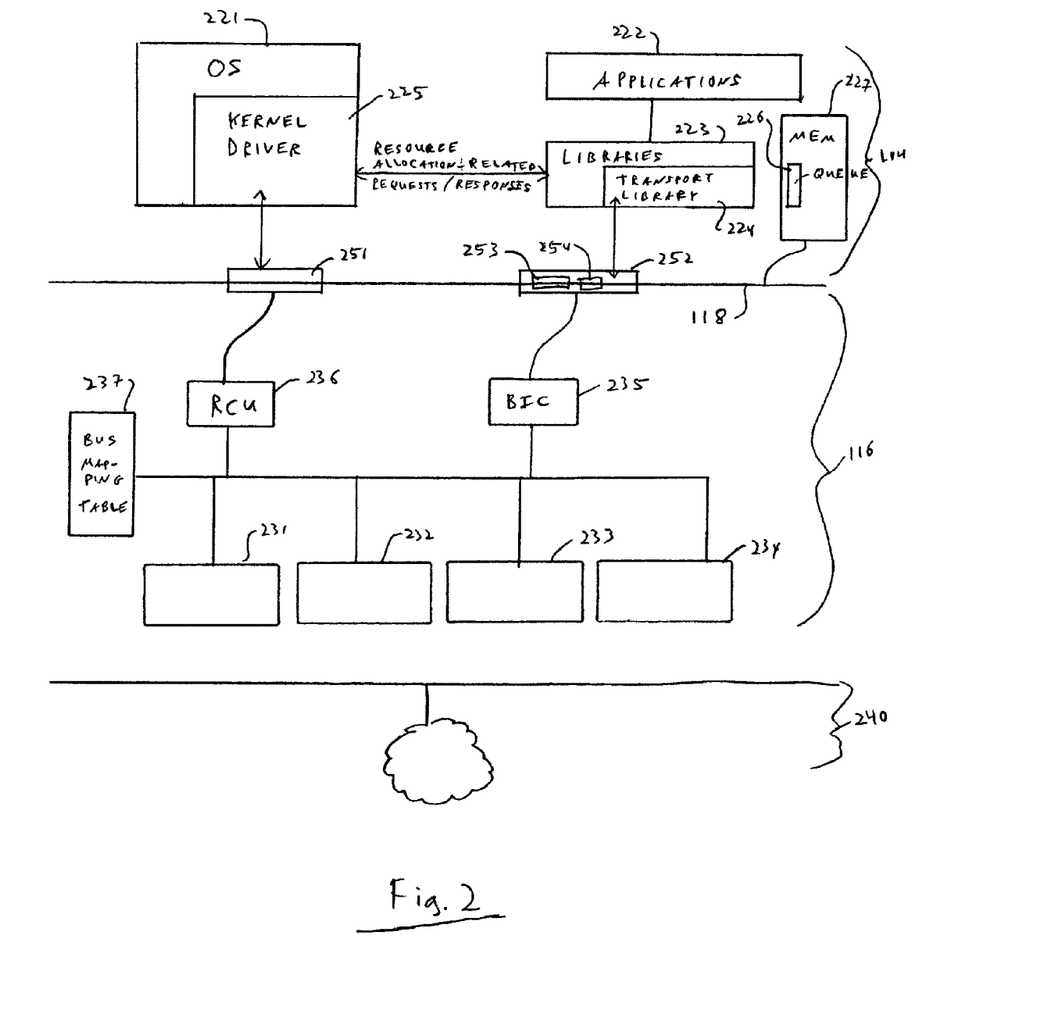
FIGS. 2 and 3 are additional views of the computer system of FIG. 1.

FIG. 2 is another view of the computer system 110, presented to better illustrate certain software and functional features. The computer runs an operating system 221 which is capable of supporting application processes 222 also running on the computer. As used herein, a "process" is a program, for example an application program, in execution. A process may run multiple "threads", which can also be thought of as lightweight processes. A library 223 of instructions is stored by the computer and available to the applications. The part of the library usable for communications with the NIC 116 is termed a transport library 224. Included in the operating system kernel is a driver component 225: a dedicated set of instructions which allow for data transfer with the NIC 116. Each application would normally take the form of a software program running on the computer, but it could be embedded in firmware. Some operating systems include applications in addition to fundamental operating system code. Aspects of the system that are not described herein may be as set out in PCT publication No. WO2004/025477, incorporated herein by reference in its entirety, or in either the US or GB applications incorporated above.

The NIC 116 can support resources of a number of types: i.e. resources having capabilities of different natures. Examples include DMA queues, event queues, timers and support resources for remote apertures of the type described in WO2004/025477. Each type of resource (231-234) is provided from a dedicated hardware resource pool which can support numerous instances of resources of the respective type. In order for such an instance to be made operational it must be configured by means of instructions from the computing device 114, as described in more detail below.

The NIC 116 communicates with the computing device 114 over the bus 118. In this example the bus is a PCI bus, but the invention is not limited to such a bus. Data transmitted over the PCI bus 118 is associated with a destination address and is received by whichever entity that is connected to the bus has had that address allocated to it. In a typical PC implementation the addresses are allocated in pages of 4 or 8 kB. One or more of these pages may be allocated to the NIC 116. Blocks 251 and 252 represent allocated pages on the PCI bus 118.

The NIC 116 has a bus interface controller 235, a resource configuration unit 236 and a bus mapping table 237. The resource configuration unit processes communications received from the computer that provide instructions on the allocation, re-allocation and de-allocation of resources on the NIC 116, and configures the resources in accordance with such instructions. The kernel driver 225 stores a record of which resources on the NIC 116 are allocated. When a resource is to be allocated the driver 225 identifies a suitable free resource of the required type on the NIC 116 and transmits an allocation instruction to the NIC 116. The instruction identifies the resource and specifies the details of how it is to be allocated, including details of the internal configuration of the resource (e.g. in the case of a timer the amount of time it is to run for). That instruction is passed to the resource configuration unit. The resource configuration unit then loads the specified configuration into the identified resource. The instruction also includes an ownership string, which may be an identification of which application or process on the computer is using the resource. The resource configuration unit stores these in a row of the bus mapping table. An example of entries in the bus mapping table is shown in FIG. 2A and is described in more detail below. When a resource is to be re-allocated the relevant entries in the resource's own configuration store and in the bus mapping table are altered as necessary. When a resource is to be de-allocated it is disabled and any rows of the bus mapping table that relate to it are deleted.

The general operation of the system of FIGS. 1 and 2 for the transfer of data to and from the network will now be described.

During setup of the system one or more pages (251, 252) on the bus 118 are allocated to the NIC 116. Part of this address space (page 251) can be used by the kernel driver 225 to send instructions to the NIC 116. Other pages (e.g. page 252) can be used for communication between application processes such as application 222 and the resources 231-234. The resource configuration unit 236 stores a record of the pages that are allocated to the NIC 116 for use by resources. Note that in some embodiments, some or all of the functions of the resource configuration unit 236 may alternatively be provided by the kernel driver 225 itself.

When an application 222 wishes to open a data connection over the network it calls a routine in the user level transport library 224 to cause the NIC resources that are required for the connection to be allocated. Standard types of network connection require standard sets of resources; for example: an event queue, transmit and receive DMA command queues, and a set of DMA'able memory buffers. For example a typical set may contain one TX command queue, one RX command queue, two timers, and on the order of 100 DMA memory buffers.

The user level transport library 224 includes routines that can be called directly by the application process 222 and that initiate the allocation of such standard sets of resources, including set numbers of resources of different types. The transport library also includes routines that allow a resource of each type to be allocated, re-allocated or de-allocated individually. The presence of both these types of instruction means that standard connections can be set up efficiently, and yet non-standard groups of resources can be created, and existing connections can be reconfigured on a resource-by-resource basis. As used herein, a "user level stack" is any protocol processing software that runs in unprotected mode. A "protocol stack" is the set of data structures and logical entities associated with the networking interfaces. This includes sockets, protocol drivers, and the media device drivers.

The routines for allocation, re-allocation and de-allocation of resources require access to restricted memory mapped addresses, such as page 251 for sending configuration instructions to the NIC 116. Since the user level transport library 224 lacks the necessary privilege level to perform these accesses, these routines in the user level transport library 224 make calls to the kernel driver 225. In a Unix environment, for example, such calls might take the form of IOCtl( ) system calls. These calls cause an initial context switch to a kernel level process, which in turn communicate the instructions to the NIC 116 for the allocation of the resources as specified in the routines. Those instructions specify the identity of the application or process with which the resources are to be associated, and the nature of the resources. The instructions are processed by the resource configuration unit 236 of the NIC 116.

A feature of the system of FIG. 2 is that the space on the bus 118 that is allocated to the NIC 116 can be split dynamically between the resources on the bus 118. Once one or more pages 252 have been allocated to the NIC 116 for use by resources those resources can be allocated one or more individual sub-page addresses within that page, corresponding to locations as illustrated at 253, 254. Thus each resource can have a part of the total space allocated to it. A record of which part of the total space is allocated to which resource is stored in the bus mapping table 237. The effect is that a single page of the bus can be used for communication to resources of multiple types and/or resources that relate to multiple connections and/or resources that are associated with multiple applications or processes on the computer 114. As a result, the total bus space can be used relatively efficiently.

The usage of the allocated bus space 252 is managed by the kernel driver 225. When a resource is to be allocated the RCU identifies using a data store whose content it manages an unused block in the space on the bus that has already been allocated for use by resources of the NIC 116, the space being of the size required for the resource. It then stores in that data store the identity of the resource ("resource ID"), the address of the block within the allocated space ("sub-page ID), and the identity of the application or process that is to use the resource ("process tag"); and sends a message to the resource configuration unit (RCU) 236 to cause it to store corresponding data in the bus mapping table 237 (as shown in FIG. 2A). If the RCU finds that table 237 indicates the address to be already occupied then it returns an error code to the driver. The sub-page address may need to be supplemented with the address of the page in which the sub-page lies if that cannot be inferred as a result of only a single page having been allocated for use by the resources. If the total space allocated for use by resources is insufficient then the kernel driver allocates it more space. Having allocated the resources, the RCU returns a success message to the kernel driver. The allocated page and sub-page addresses are returned to and mapped into the virtual address space of the user level process that requested the resources in order that it can access them by means of that data. Another context switch then takes place back to the user level calling process.

An application that has had resources allocated to it can access them by sending data (e.g. by means of load/store cycles through a virtual memory mapping) to the relevant bus page, at the sub-page address corresponding to the respective resource. Since these addresses are part of the application's virtual address space, no context switch to any kernel level processes are required in order to perform these accesses. Any data sent to pages allocated to resources is picked off the bus 118 by the bus interface controller 235. It directs that data to the appropriate one of the resources 231-234 by performing a look-up in the table 237 to identify the identity of the resource to which the sub-page address has been allocated. An application can also access a resource by means other than a bus write: for example by means of direct memory access (DMA). In those instances, the NIC 116 checks that the identity of the application/process from which the access has been received matches the identity indicated in the table 237 for the resource. If it does not match, the data is ignored. If it matches, it is passed to the relevant resource. This adds to security and helps to prevent corruption of the resources by other applications.

The set of resources allocated to an application or process may be considered to constitute a virtual network interface (VNIC).

Once a virtual interface has been composed, it may be reconfigured dynamically. As one example of dynamic reconfiguration, a resource that is no longer required may be freed-up. To achieve this the application using the resource calls a de-allocation routine in the user level transport library 223. The de-allocation routine calls the kernel driver 225, which instructs the RCU to de-allocate the resource by disabling it, clearing its status and deleting its row in the table 237.

As another example of dynamic reconfiguration, additional resources may be added to the VNIC. The process is analogous to that described above for initial composition of the VNIC.

As yet another example of dynamic reconfiguration, resources may be passed from one application or process to another. This is most useful in the situation where a single application has multiple processes and wants to pass control of a resource from on process to another, for example if data from the network is to be received into and processed by a new process. To achieve this the application using the resource calls a re-allocation routine in the transport library 223. The re-allocation routine calls the kernel driver 225, which instructs the RCU to re-allocate the resource modifying its row in the table 237 to specify the identity of the application or process that is taking over its control.

In some instances it may be desirable for resources of one type to communicate with resources of another type. For example, data received from the network 240 may be being passed to an application 222 for processing. The application has a queue 226 in a memory 227 connected to the bus 118. The queue is managed in part by the transport library 223, which provides a DMA queue resource 231 on the NIC 116 with an up-to-date pointer to the next available location on the queue 226. This is updated as the application reads data from the queue 226. When data is received from the network it is passed to an event queue resource 232, which writes it to the location identified by the pointer and also triggers an event such as an interrupt on the computing device 114 to indicate that data is available on the queue. In order for this to happen the event queue resource 232 must learn the pointer details from the DMA queue resource 231. This requires data to be passed from the DMA queue resource to the event queue resource.

To achieve this the "process tag" column of the table 237 can be treated more generally as an ownership tag, and can link the DMA queue to the related event queue. To achieve this the ownership tag of the event queue can be set to the identity of the related DMA queue. When the DMA queue needs to pass data to the related event queue it can identify the event queue from the table 237 by performing a look-up on its own identity in the ownership tag column.

Data intended to be passed from one resource to another can be checked by the bus controller 235 to ensure that it is compatible with the settings in the table 237. Specifically, when data is to be sent from one resource to another the bus controller checks that there is a row in the table 237 that has the identity of the resource that is the source of the data in the ownership tag field, and the identity of the resource that is the intended destination of the data in the resource ID field. If there is no match then the data is prevented from reaching its destination. This provides additional security and protection against corruption. Alternatively, or in addition, it may be permitted for one resource to transmit data to another if both are in common ownership: in this example if their resource ID fields indicate that they are owned by the same process, application or other resource.

The identities of resources linked in this way can also be reconfigured dynamically by means of the re-configuration routines in the transport library.

Figure 3:
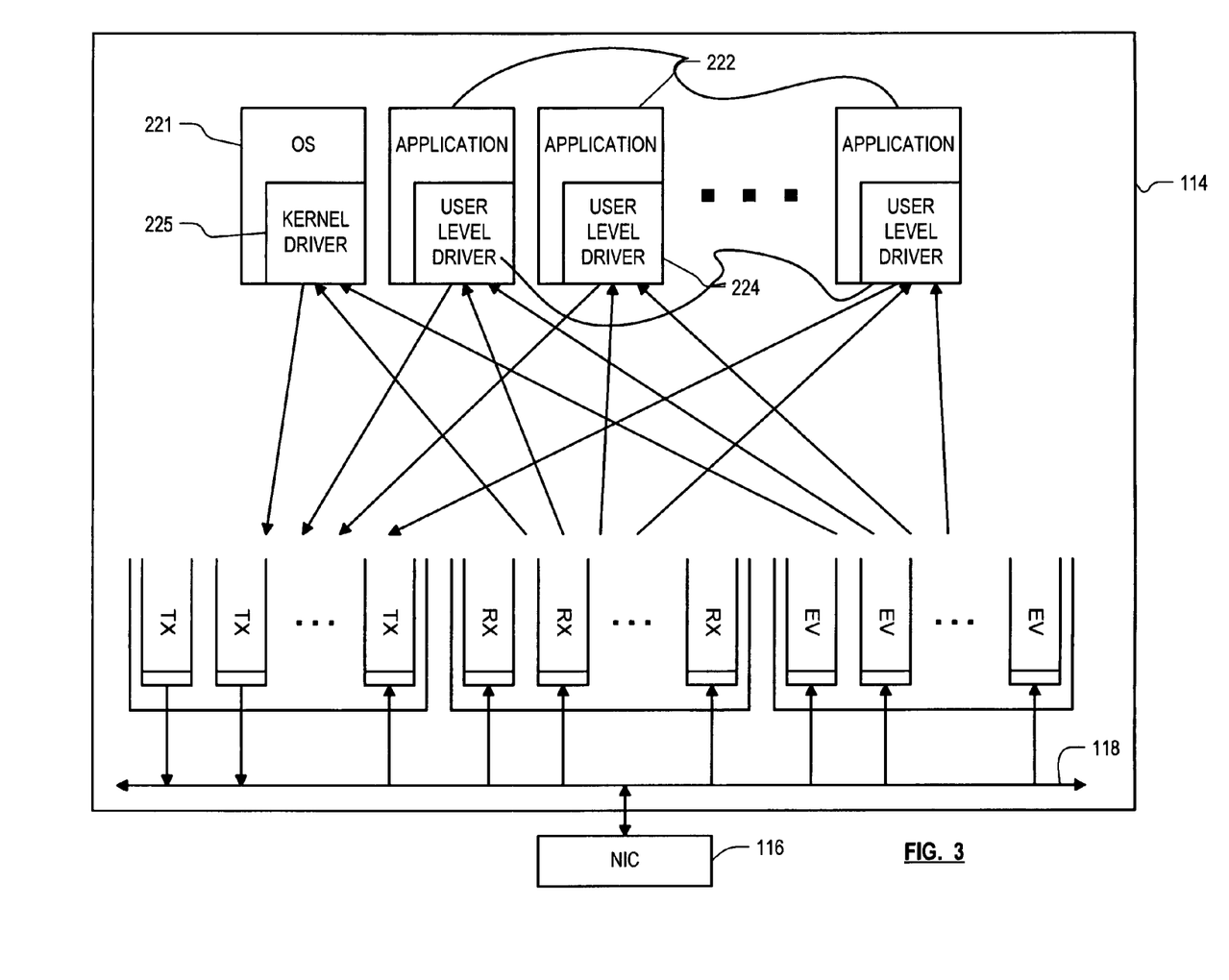

As a result of the above mechanisms, the operating system and many application programs can each maintain multiple TX, RX and Event DMA command queues. FIG. 3 illustrates this feature. As can be seen, the operating system 221 maintains, via kernel driver 225, TX, RX and Event data queues. Each such queue has an associated DMA command queue, not shown in FIG. 3 but maintained in the host memory 122 by the kernel driver 225. Multiple applications 222 can also be running in the computer system, each with its own instance of user level driver 224. Each such application 222 maintains, via its respective user level driver instance 224, TX, RX and Event data queues. As with the kernel queues, each such TX, RX and Event data queue has an associated DMA command queue, not shown in FIG. 3 but maintained in the host memory 122 by the respective user level driver 224.

Figure 5:
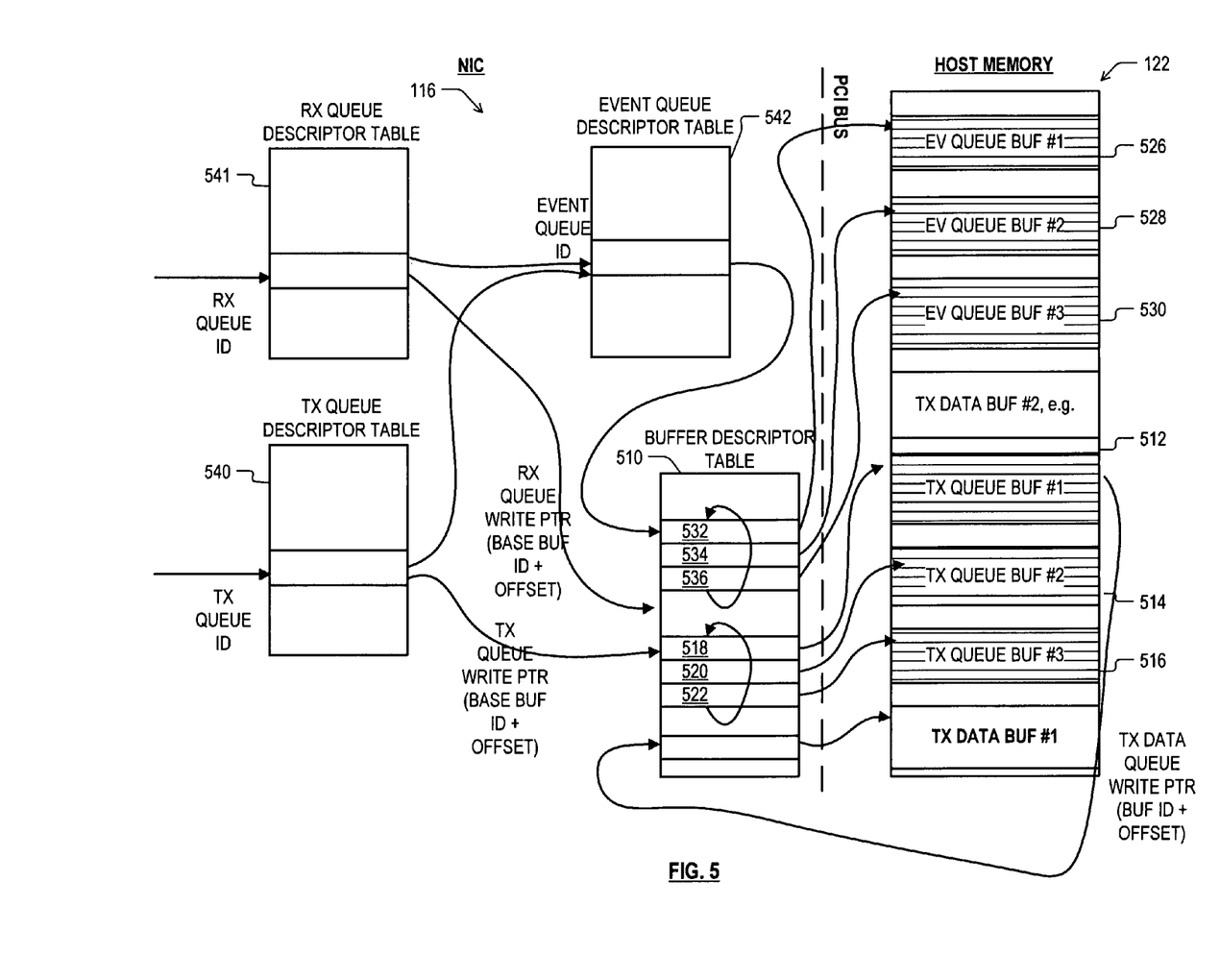
FIG. 5 is a block diagram of data structures used by the system of FIGS. 1-3 in order to support separate transmit and receive queues for different VNICs.

FIG. 5 is a block diagram of various data structures used by the system of FIGS. 1-3 in order to support separate transmit and receive queues for each of the VNICs. The diagram indicates which structures exist in host memory 122 and which exist on the NIC 116. The transmit and receive data buffers, the transmit and receive DMA descriptor queues, as well as one or more event queues, are all resident in host memory 122 and made up of generalized buffers which can be discontiguous and interspersed with each other in host memory 122. In FIG. 5, the buffers being used as transmit data buffers are identified as "TX DATA BUF #n", and the buffers being used for a TX DMA command queue (or more simply, a transmit queue) are identified as "TX QUEUE BUF #n". The buffers being used for the event queue are identified as "TX EV QUEUE BUF #n". Additional buffers in host memory 122, not shown explicitly in FIG. 5, are used for receive data buffers and for a RX DMA command queue (also called simply a receive queue). One process may have any number of transmit, receive and event queues, and all of them share the pool of generalized buffers that have been mapped into that process's virtual address space. Other processes us a different pool of generalized buffers mapped into their respective virtual address spaces.

Individual buffers may be either 4 k or 8 k bytes long in one embodiment, and they are chained together into logically contiguous sequences by means of physically contiguous descriptors in a buffer descriptor table 510 stored in the NIC 116. For example, one transmit queue might occupy buffers 512, 514 and 516 in host memory 122, which are discontiguous and possibly out-of-order regions of memory. They are chained together into a single logically contiguous space by the physically contiguous entries 518, 520 and 522 in the buffer descriptor table 510. The entries 518, 520 and 522 are written and managed by the host 114 and are viewed as a wrap-around ring. So for example, if the host wishes to define a transmit queue having 64 k entries for transmit data buffer descriptors, and each buffer is 4 k in size, then the host will allocate a physically contiguous sequence of 16 entries in buffer descriptor table 510 for this transmit queue. Similarly, one event queue might occupy buffers 526, 528 and 530 in host memory 122. These buffers are discontiguous and possibly out-of-order in host memory, but are chained together into a single logically contiguous wrap-around space by the physically contiguous entries 532, 534 and 536 in the buffer descriptor table 510. The buffer descriptor table 510 is indexed by "buffer ID", and each of its entries identifies, among other things, the base address of the corresponding buffer in host memory 122.

In order to keep track of the state of each of the transmit, receive and event queues for the many user-level applications that might be in communication with NIC 116 at the same time, the NIC 116 includes a transmit queue descriptor table 540, a receive queue descriptor table 541, and an event queue descriptor table 542. The transmit, receive and event queue descriptor tables are shown in FIG. 5 as separate tables, each containing the entire table, but it will be appreciated that in different embodiments the three tables can be implemented as a single unified table, or one of the tables can be implemented as separate sub-tables (divided by columns or by rows or by both), or some combination of these variations might be implemented. Each transmit queue has a corresponding transmit queue ID, which is used as an index into the transmit queue descriptor table 540. The designated entry in the transmit queue descriptor table 540 is the starting point for describing the state and other characteristics of that particular transmit queue, as viewed by the NIC 116. Each such entry identifies, among other things:

- whether the queue is a kernel queue, user queue or another kind of queue;
- the size of the queue (number of transmit data buffer descriptors it can contain)
- the ID of the event queue associated with this transmit queue;
- buffer ID of base buffer for this transmit queue;
- "device centric" read and write pointers into this transmit queue.

The host 114 maintains "host centric" versions of the read and write pointers as well, and when it is ready to have transmit data transmitted, it so notifies the NIC 116 by writing its updated host centric transmit queue write pointer into the address on the NIC of the device centric transmit queue write pointer for the particular transmit queue.

In order to retrieve current transmit data from a particular transmit queue in host memory 122, the NIC 116 first uses the ID of the particular transmit queue to look up, in the transmit queue descriptor table 540, the buffer ID of the base buffer containing the transmit descriptor queue. The NIC 116 also obtains from the same place, the current device centric read pointer into that transmit descriptor queue. It then uses the base buffer ID as a base, and the device centric read pointer high order bits as an offset, into the buffer descriptor table 510, to obtain the base address in host memory 122 of the buffer that contains the particular transmit queue. The NIC then uses that base address as a base, and as an offset the device centric transmit queue read pointer low order bits times the number of bytes taken up per descriptor, as a starting host memory address for retrieving entries from the particular transmit descriptor queue. Importantly, the NIC does not allocate separate space for maintaining a write pointer into any local cache into which these entries will be written.

Each entry in the particular transmit descriptor queue contains, among other things:

- the buffer ID of a transmit data buffer;
- a byte offset into the transmit data buffer; and
- a number of bytes to be transmitted from that transmit data buffer.

The NIC 116 then uses the buffer ID of the current transmit data buffer as another index into buffer descriptor table 510 to retrieve the buffer descriptor for the buffer that contains the current transmit data. Note this buffer descriptor is an individual entry in buffer descriptor table 510; unlike the descriptors for buffers containing transmit queues or transmit event queues, this buffer descriptor is not part of a ring. The NIC 116 obtains the physical address in host memory 122 of the current transmit data buffer, and then using that physical address as a base, and the byte offset from the transmit descriptor queue entry as an offset, it determines the physical starting address in host memory 122 of the current data to be transmitted.

The system handles receive queues in a similar manner.

The transmit queue descriptor table 540 entry designated by the transmit queue ID, as previously mentioned, also contains the ID of the transmit event queue associated with the particular transmit queue. Similarly, the receive queue descriptor table 541 entry designated by the receive queue ID contains the ID of the event queue associated with the particular receive queue. All of the event queues for all the applications 222 are described by respective entries in the event queue descriptor table 542. The entry in the event queue descriptor table 542 identified by a queue ID from the transmit or receive queue descriptor table 540 or 541 is the starting point for describing the state and other characteristics of that particular event queue, as viewed by the NIC 116.

Note that as illustrated in FIG. 5, whereas each slot (e.g. 532, 534, 518) shown in the buffer descriptor table 510 represents a single descriptor, each slot (e.g. 526, 528, 514) in the host memory 122 represents a memory "page" of information. A page might be 4 k or 8 k bytes long for example, so if a transmit data buffer descriptor in a transmit queue occupies either 4 or 8 bytes, then each slot 512, 514 or 516 as shown in FIG. 5 might hold 512, 1 k or 2 k transmit data buffer descriptors.

Figure 4:
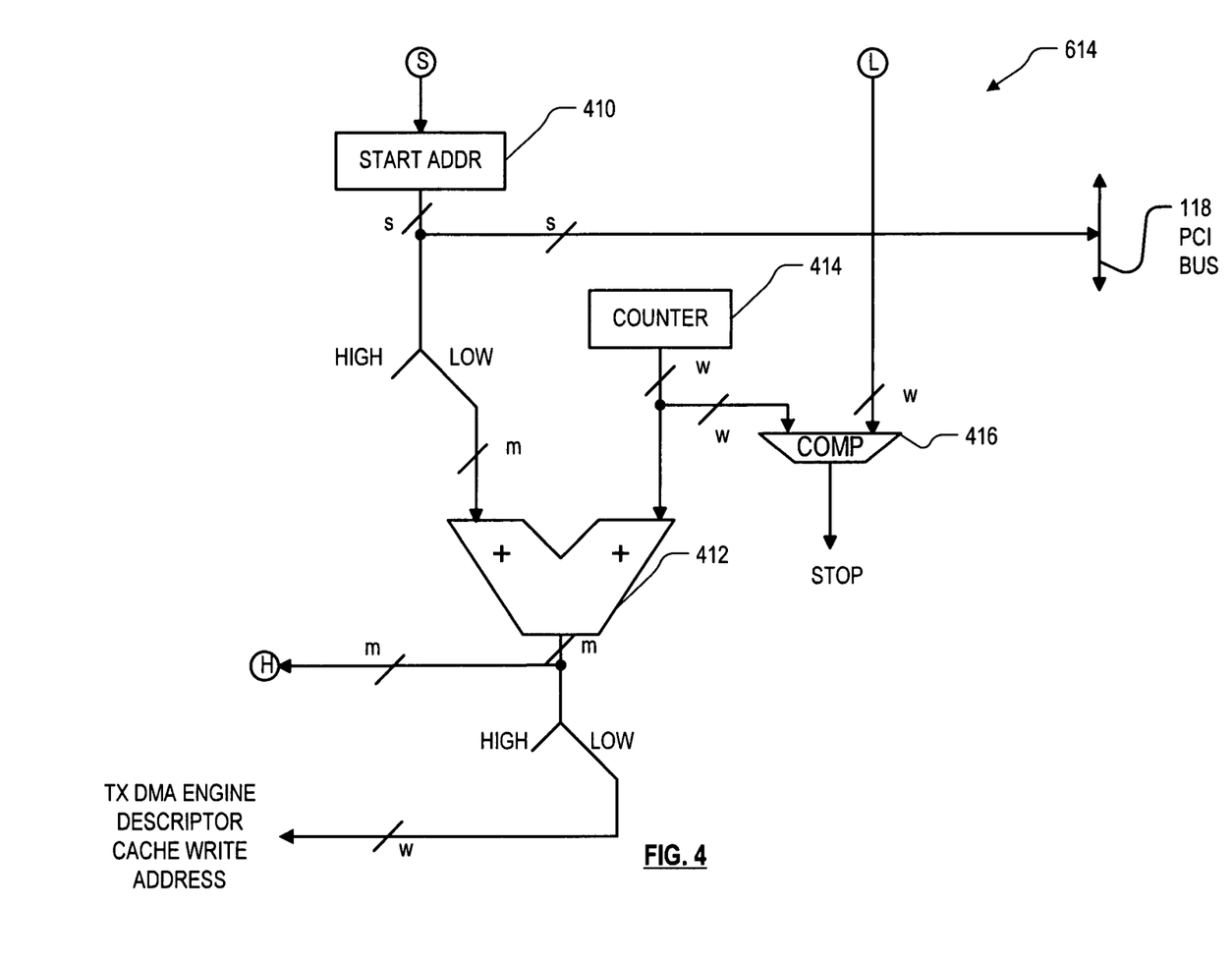
FIGS. 4, 6 and 7 symbolically illustrate hardware features in the NIC 216 for implementing the retrieval of transmit DMA descriptors and transmit data packets.
Figure 6:
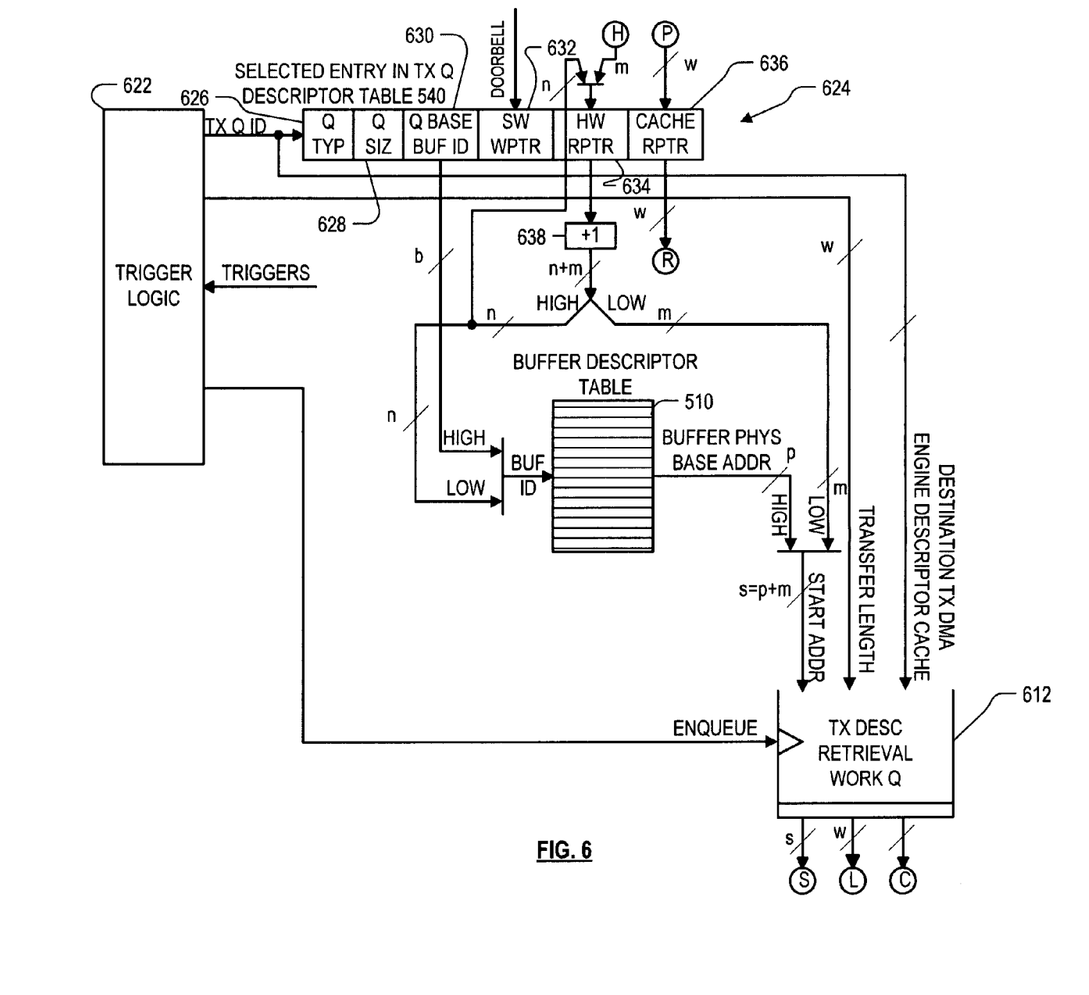
Figure 7:
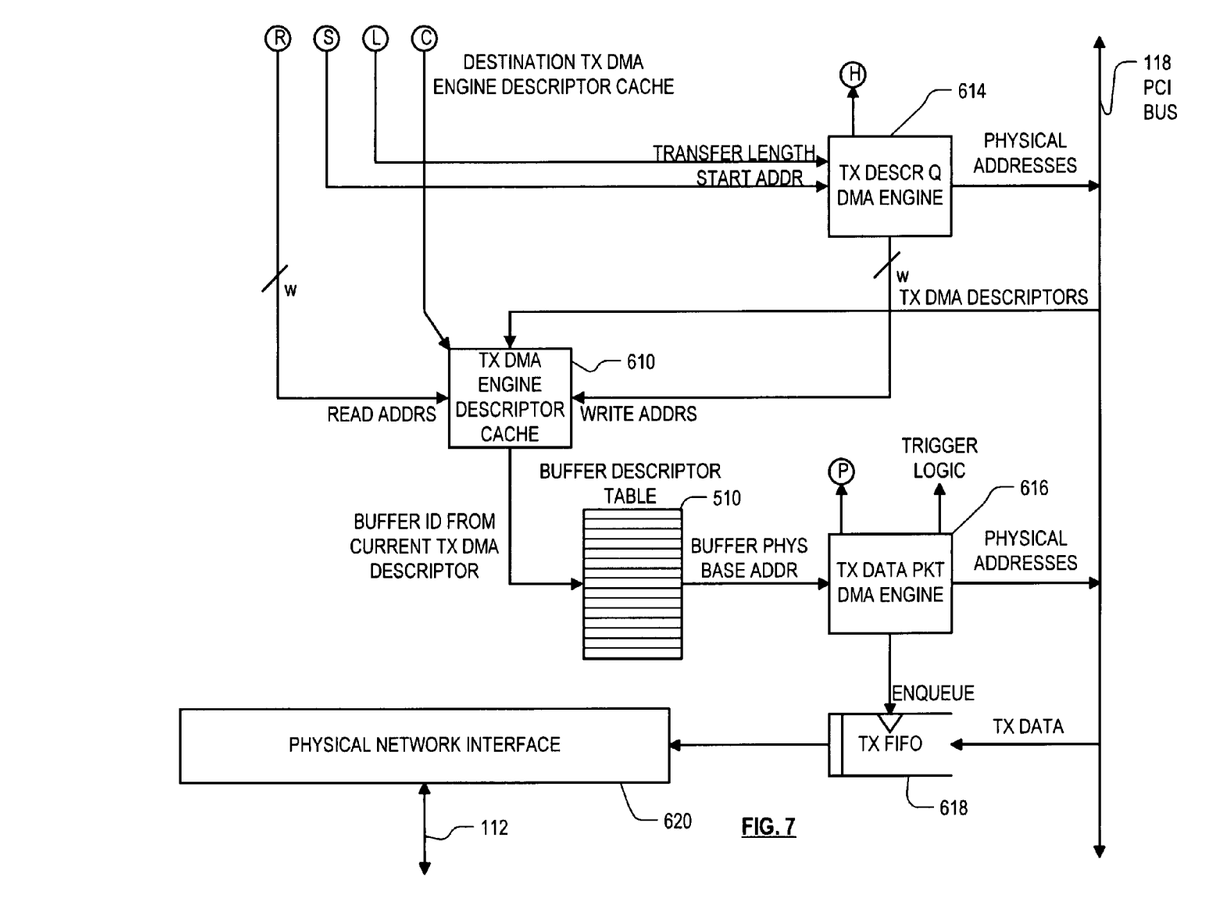

FIGS. 4, 6 and 7 symbolically illustrate hardware features in the NIC 216 for implementing the retrieval of transmit DMA descriptors and transmit data packets. In FIGS. 4, 6 and 7, the circled letters H, P, R, S, L and C represent values carried from one of the figures to another. The diagrams in these figures are intended primarily to illustrate data flow, so most control features are omitted as are most delay and other timing elements required to coordinate data flow along different paths.

The hardware of FIGS. 6 and 7 includes an individual transmit DMA engine descriptor cache 610 corresponding to each individual one of the transmit queues described in the transmit queue descriptor table 540. If the NIC supports up to 4 k transmit queues, for example, then there are 4 k transmit DMA engine descriptor caches 610. But for simplicity of illustration, only one such cache 610 is shown in the drawing. In one embodiment these caches are implemented as separate memory arrays, whereas in another embodiment they are implemented as separate regions of one or more combined memory arrays. These caches 610 maintain in essence a "jumping window" into the transmit DMA descriptors in the particular transmit queue. Each transmit DMA engine descriptor cache may include space for a number of descriptors, which may for example be on the order of 8-128 descriptors depending on the embodiment an depending on the size of each descriptor. The NIC may need only one descriptor at any particular time, but maintaining a cache of descriptors improves pipelining, and also permits the NIC to take advantage of burst transfer protocols on the PCI bus 118 for retrieving transmit DMA descriptors.

The hardware further includes a transmit descriptor retrieval work queue 612, into which DMA instructions are written for the retrieval of transmit DMA descriptors. The descriptors in the transmit descriptor retrieval work queue 612 are provided to a transmit descriptor DMA engine 614, which controls the DMA retrieval of one or more transmit DMA descriptors into the transmit DMA engine descriptor cache 610. The hardware further includes a transmit data packet DMA engine 616, which controls the retrieval of actual transmit data from the host memory 222 into a transmit FIFO 618. Data packets at the head of the transmit FIFO 618 are driven onto the network 112 by a physical network interface 620. Not shown in FIGS. 6 and 7 is an arbiter for arbitrating control of the bus 118 among the transmit descriptor queue DMA engine 614 and the transmit data packet DMA engine 616, as well as a receive descriptor queue DMA engine and a receive data packet DMA engine, as well as other agents not shown.

In general operation, trigger logic and 622, in response to particular triggers described hereinafter, selects a particular transmit queue ID from which transmit DMA descriptors are to be retrieved the next. The transmit queue ID identifies a corresponding individual entry in the transmit queue descriptor table 540, a portion of which is reproduced as entry 624 in FIG. 6. It can be seen that among other things, the transmit queue descriptor table includes a field 626 identifying the type of the queue. In an embodiment, a transmit queue may be a kernel queue, a user queue or another kind of queue. The transmit queue descriptor table entry 624 also includes a queue size field 628 which indicates the number of descriptors that the particular transmit queue can contain. Descriptors are of different sizes depending on the queue type, so the length of the queue in bytes depends on both the queue type field 626 and the queue size field 628.

The transmit queue descriptor table entry 624 also includes a field 630 containing the base buffer ID of the queue. A complete transmit queue can span multiple buffers in host memory 222. The buffer size is usually selected to be equal to the page size of the memory. The buffers containing a transmit queue need not be contiguous in host memory 222, as previously explained, as long as they are given consecutive buffer ID's. As described above, the buffer descriptor table 510 in the NIC performs a translation between buffer ID's and buffer physical base addresses.

The transmit queue descriptor table entry 624 also includes a field 632 for containing a device-centric copy of the software write pointer into the transmit queue. Whenever the driver that owns a particular transmit queue has one or more transmit data buffers ready to transmit, it writes the transmit DMA descriptors into the transmit queue in host memory and copies its updated transmit queue write pointer into this field 632 of the entry 624 of the transmit queue descriptor table 540. The address of field 632 is sometimes referred to herein as a "doorbell" address, since it is one of the events that trigger logic 622 may use in determining whether to retrieve one or more new transmit descriptors from the transmit queue into the transmit DMA engine descriptor cache 610.

The transmit queue descriptor table entry 624 also includes a field 634 for containing a device-centric read pointer into the transmit queue in host memory 222. This pointer indicates an offset to the most recent transmit descriptor in the transmit queue in host memory that has been read into the NIC 216. As described in more detail hereinafter, this hardware read pointer 634 is also used to derive a write pointer into the transmit DMA engine descriptor cache 610, thereby conserving space on the integrated circuit chip. The transmit queue descriptor table entry 624 also includes a cache read pointer 636, which is used as a read pointer into the transmit DMA engine descriptor cache 610.

When an entry 624 in the transmit queue descriptor table 540 is selected, the NIC 216 determines the starting physical memory address from which to retrieve transmit descriptors by incrementing the value in the hardware read pointer field 634 by one (via incrementer 638), and then concatenating low order bits of the incremented hardware read pointer 634 as low order bits of the starting address, to the buffer physical base address as high order bits. It will be convenient to think of the hardware read pointer 634 as having n high order bits followed by m low order bits, the m low order bits of the incremented hardware read pointer 634 being the ones that are concatenated as low order bits of the starting address.

The starting physical memory address determined in this matter is later multiplied by the number of bytes in each transmit descriptor when it is required to specify the byte address. The buffer physical base address is the address read out from the buffer descriptor table 510 at a location identified by a provided buffer ID, which is constructed using the queue base buffer ID 630 as high order bits, and the high order n bits of the incremented hardware read pointer 634 as low order bits.

The buffer physical base address identifies the base physical address of the current buffer of transmit queue entries. The m low order bits of the incremented hardware read pointer 634 can be thought of as an offset into the current memory buffer. Since the high order bits of the incremented hardware read pointer 634 form low order bits of the buffer ID provided to the buffer descriptor table 510, it can be seen that the incrementing of the hardware read pointer 634 by incrementer 638 may cause the buffer ID to also increment. This will change the buffer physical base address output of the buffer descriptor table 510 to that of the next chained buffer of transmit queue entries. Additionally, since incrementer 638 has a fixed number of bits, buffer usage will eventually wrap around and begin again at the beginning of the first buffer in the chain. That is, the incrementer 638 increments "modulo" the length of the buffer chain. Incrementer 638 is sometimes referred to herein for that reason as a "modulo-incrementer".

The starting physical memory address determined as above is provided as part of a transmit descriptor retrieval instruction, into the transmit descriptor retrieval work queue 612. Another field of the instruction is the transfer length L, which is provided by the trigger logic 622 as described hereinafter. Yet another field of the instruction identifies the destination transmit DMA engine descriptor cache C into which the retrieved transmit descriptors will be written. C is derived from the transmit queue ID, i.e. not provided by the transport library, since each transmit queue has a respective corresponding transmit DMA engine descriptor cache. When a transmit descriptor retrieval instruction is ready, it is enqueued into the transmit descriptor retrieval work queue 612 in response to a signal from the trigger logic 622.

From the instruction at the head of the transmit descriptor retrieval work queue 612, the starting address S and transfer length L are provided to the transmit descriptor queue DMA engine 614 and the destination transmit DMA engine descriptor cache identifier C is provided to select the appropriate cache 610 into which the descriptors will be written. The DMA engine 614, after arbitrating for control of the bus 118, controls the DMA transfer of the descriptors from the current host memory buffer into the designated transmit DMA engine descriptor cache 610.

FIG. 4 is a symbolic diagram of the pertinent features of the transmit descriptor queue DMA engine 614 (FIG. 7). It can be seen that the starting address S is provided to a register 410. From there it is provided, at an appropriate time, to address/data lines of the bus 118. The m low order bits of the starting address 110 are also provided to one input of an adder 412, the other input of which is connected to the output of a w-bit counter 414. 'w' is the number of address bits required to address a single descriptor in the transmit DMA engine descriptor cache 610, and depends on the size of the cache in the particular embodiment. In the present embodiment, since a transfer of transmit descriptors from host memory 222 into the transmit DMA engine descriptor cache 610 is not allowed to continue beyond the end of the current host memory buffer in a single burst, w is always less than or equal to m.

The output of the counter 414 is provided to one input of a comparator 416, the other input of which receives the transfer length L from the current instruction in the transmit descriptor retrieval work queue 612. The counter 414 begins each burst transfer at zero and counts the number of descriptors retrieved from memory 222 in the burst. During the transfer, the low order w bits of the output of adder 412 identify the address in the transmit DMA engine descriptor cache 610 at which the current incoming descriptor is to be written. When the count reaches the transfer length L, the comparator 416 signals the transfer descriptor queue DMA engine 614 to terminate the transfer.

At the end of the transfer, the m-bit output of adder 412 is concatenated as low order bits with the n high-order bits as output from incrementer 638, to form a new hardware read pointer value. This value is written into the hardware read pointer field 634 of the current entry 624 of the transmit queue descriptor table 540. Again, the low order m bits of this value represent both the offset into the last entry of the host memory transmit queue that has been read into the cache 610, and also the address in the transmit DMA engine descriptor cache 610 at which such last retrieved entry was written. Storage for these two pointers is combined into a single field, thereby saving significant space on the integrated circuit chip. The n high order bits of the new hardware read pointer 634 are either the same as those that the field contained previously, or they have been modulo-incremented by one due to the incrementer 638. There is no risk that the n high order bits of the new hardware read pointer 634 will have been incremented also due to the action of counter 414 and adder 412, because as previously mentioned a single burst transfer is not allowed to continue beyond the end of the current host memory buffer, and the value in the hardware read pointer 634 in the present embodiment points to the last descriptor read, not the next descriptor to be read.

Transmit DMA descriptors are read out of the transmit DMA engine descriptor cache 610 in accordance with a w-bit read address R, stored in the cache read pointer field 636 of the selected entry 624 of the transmit queue descriptor table 540. Each transmit DMA descriptor identifies the buffer ID of the buffer in host memory 222 containing the transmit data. As shown in FIG. 7, this buffer ID is provided to the buffer descriptor table 510 (repeated in FIG. 7 for simplicity of illustration), and the corresponding buffer physical base address is read out and provided to the transmit data packet DMA engine 616 for retrieving transmit data packets. The DMA engine 616 provides physical addresses via an arbiter (not shown) onto the bus 118 for retrieving the transmit data. Retrieved transmit data is written into the tail of transmit FIFO 618, in response to an enqueue signal from the transmit data packet DMA engine 616. Data packets from the head of the transmit FIFO 618 are provided to physical network interface 620, and from there are driven out onto the network 112.

As mentioned, trigger logic and 622 selects the particular transmit queue ID from which transmit DMA descriptors are to be retrieved next. In the embodiment of FIG. 6, the trigger logic 622 selects a particular transmit queue ID when either of two conditions occur. The first condition occurs in response to an update from the host system of the software write pointer field 632 (the doorbell) of the particular transmit queue, indicating that one or more transmit packets are ready for retrieval. In response to the doorbell, the trigger logic 622 determines whether the transmit DMA engine descriptor cache 610 corresponding to the particular queue already contains the descriptor pointed to by the new software write pointer. If not, then the trigger logic 622 also compares the cache read pointer 636 to the cache write pointer (which it obtains from the low order bits of the hardware read pointer 634) to determine whether there is any space for a new transmit descriptor in the particular transmit DMA engine descriptor cache and 610. If so, then the entry corresponding to the particular queue in the transmit queue descriptor table 540 is selected and the transmit descriptor retrieval instruction is written into the work queue 612.

The second condition in response to which the trigger logic 622 selects a particular transmit queue ID, occurs in response to completion of each retrieval of a transmit data buffer from the host memory 222 into the transmit FIFO 618. At this time, again if there is space in the corresponding transmit DMA engine descriptor cache 610 for at least one new transmit descriptor, the entry corresponding to the particular queue in the transmit queue descriptor table 540 is selected and the transmit descriptor retrieval instruction is written into the work queue 612.

In an alternative embodiment, the second condition occurs not in response to completion of each retrieval of a transmit data buffer, but only in response to a low water mark condition in the transmit DMA engine descriptor cache 610. This alternative can reduce the number of PCI transactions since larger blocks of descriptors usually will be fetched. However, additional logic may be necessary to determine the low water mark condition from the read and write pointers into the cache 610.

The transfer length L as shown in FIGS. 4, 6 and 7 is determined by the trigger logic 622 as the largest number of transmit DMA descriptors possible, given at least the following limitations. First, naturally, the transfer length is limited by the number of transmit DMA descriptors available in the host memory for retrieval. This information is determined from the difference between the hardware read pointer 634 and the software write pointer 632. Second, since a burst transfer is not allowed to continue beyond the end of the current host memory buffer in this embodiment, the transfer length is further limited by the number of such transmit DMA descriptors that remain in the current host memory buffer. Third, the transfer length is limited by the amount of space available in the current transmit DMA engine descriptor cache 610. Since a burst retrieval of transmit descriptors is allowed to wrap around in the cache 610 in this embodiment, the amount of space available in the current transmit DMA engine descriptor cache 610 is calculated as the modulo difference between the current read and write pointers into the cache 610. Again, the read pointer comes from field 636 of the current transmit queue descriptor table entry 624, and the write pointer comes from the low order w bits of the hardware read pointer field 634. Finally, the actual transfer length also may be limited by system considerations which restrict the transfer burst length allowed on the bus 118, and may also be limited by self-imposed restrictions intended to limit latency for other, perhaps more time critical, transfers. The burst length can change on a transaction-by-transaction basis.

As used herein, "modulo" arithmetic refers to arithmetic taken modulo the length of the cache. Thus the "modulo difference" between two pointers into a cache is equal to the arithmetic difference between the two pointers, taken modulo the length of the cache. As another example, the "modulo sum" of a pointer into a cache and an offset, is equal to the arithmetic sum of the pointer and the offset, take modulo the length of the cache.

On the receive side of the network interface card, the hardware features and their operation are similar to that described above for the transmit side. The receive DMA descriptors, when provided to the receive data packet DMA engine, control the transfer into the identified host memory buffer of data packets received from the network, instead of controlling the transfer of transmit data from the identified host memory buffer out onto the network; but most other functions are the same. Receive DMA descriptors are retrieved by DMA into a receive DMA engine descriptor cache (not shown) in much the same manner that transmit DMA descriptors are retrieved by DMA into transmit DMA engine descriptor cache 610, and as on the transmit side, the write pointer used to write newly retrieved receive descriptors into the receive DMA engine descriptor cache is derived from the device centric read pointer into receive queue in host memory. The device centric read pointer is maintained in a field in the current entry in the RX queue descriptor table 541, much like field 634 in the current entry in the TX queue descriptor table 540 maintains the device centric read pointer on the transmit side.

The trigger logic on the transmit side also is not qualitatively different from that on the receive side, except to note that in the case of a receive queue that is enabled for the receipt of jumbo packets (packets that can be longer than a single buffer in host memory), the trigger logic does not wait for an entire packet to be written to host memory 222 to evaluate the second condition described above. The trigger logic can select a particular receive queue that is in jumbo mode after the transfer into host memory of a buffer is completed, even if that transfer did not end the data packet. In addition, on the receive side, there is a third condition that can trigger selection of a particular receive queue ID: arrival of a receive data packet. This causes the descriptor cache pre-fetch logic to evaluate the pointer watermark and if it is below the low water mark, then pre-fetch is triggered. This third trigger condition does not duplicate the alternative second condition described above (a low water mark condition in the receive DMA engine descriptor cache), because the alternative second condition might not succeed in triggering retrieval of descriptors if, for example, the pre-fetch queue was busy or the PCI-bus was busy. In this case the third condition will ensure that the waiting descriptors are pre-fetched.

It can be seen that on both the transmit side and the receive side, the write pointer into the DMA engine descriptor cache corresponding to a particular queue is derived algorithmically from the device-centric starting read pointer into the queue in host memory. In the present embodiment the starting write address into the cache for a particular transfer of DMA descriptors is considered derived from the device-centric starting read pointer because it is taken identically from the low order w bits of such device-centric starting read pointer (identity is considered herein to be a special case of derivation), and subsequent write addresses into the DMA engine descriptor cache for that transfer are considered derived from the device-centric starting read pointer because they are taken from the modulo sum of the low order w bits of the starting device-centric read pointer and a count of the number of descriptors that have already been retrieved.

In other embodiments, the DMA engine descriptor cache write pointer may be derived from the starting device centric read pointer in many other ways. For example, in an embodiment in which the peripheral bus does not support a burst transfer protocol, the transmit descriptor DMA engine 614 and the equivalent receive descriptor DMA engine (not shown) might have to drive a new host memory read address onto the peripheral bus for each descriptor being retrieved. In such a case the DMA engine descriptor cache write pointer may be always taken identically from the low order w bits of the host memory read address. In this case the starting write address into the cache for a particular transfer of DMA descriptors is considered derived from the device-centric starting read pointer into the queue in host memory because it is taken identically from the low order w bits of such device-centric starting read pointer, and subsequent write addresses into the DMA engine descriptor cache for that transfer are considered derived from the device-centric starting read pointer into the queue in host memory because they are taken identically from the low order w bits of the incremented device-centric read pointer, which in turn was derived from the device-centric starting read pointer.

In yet another example, the DMA engine descriptor cache write pointer may be calculated as the device-centric starting read pointer plus a fixed offset, plus a count of the number of descriptors already retrieved, all taken modulo the length of the descriptor cache. In this case the starting write address into the cache for a particular transfer of DMA descriptors is considered derived from the device-centric starting read pointer into the queue in host memory because it is the modulo sum of the device-centric starting read pointer plus the fixed offset, and subsequent write addresses into the DMA engine descriptor cache for that transfer are considered derived from the device-centric starting read pointer into the queue in host memory because they are taken as the modulo sum of the device-centric starting read pointer plus the fixed offset, plus the count of the number of descriptors already retrieved. Many other variations will be apparent to the reader.

As used herein, a "byte address" is an address having sufficient precision to uniquely identify a single byte of memory. A "buffer descriptor address" is an address having sufficient precision to uniquely identify a single buffer descriptor. If a buffer descriptor in a particular embodiment occupies 64 bits (8 bytes), then the 3 low order bits of a byte address are ignored when interpreting the address as a "buffer descriptor address". The low order 3 bits can be completely omitted in some embodiments. Additionally, a "descriptor queue starting buffer descriptor address" is an address of a buffer descriptor in the descriptor queue, and a "descriptor cache buffer descriptor address" is an address of a buffer descriptor in a descriptor cache. The term "address", without an indication of its precision, is considered herein to be generic to all levels of precision; the context will usually indicate what level of precision is intended.

The techniques described herein have been described specifically with respect to the data transfer needs of NICs, but it will be understood that other kinds of peripheral devices aside from NICs can benefit as well. For example other types of peripheral devices might not designate their data transfer DMA queues as TX or RX queues; in a particular embodiment a queue can mix commands for the transfer of data from host memory to peripheral device with commands for the transfer of data in the opposite direction, as well as commands for other purposes entirely. Nor is it necessary that thousands of queues be supported. The techniques described herein can be beneficial whenever the amount of space saved on-chip by the elimination of write pointers exceeds the amount of space occupied by the logic required to derive the write addresses algorithmically.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method for retrieving via a communication channel, buffer descriptors from a host memory for use by a peripheral device, comprising the steps of:

providing a first descriptor cache that is accessible to the peripheral device without communication via the communication channel;

establishing a first starting buffer descriptor read address for a first host memory descriptor queue from which to initiate retrieval of a first set of at least one buffer descriptor;

retrieving the first set of buffer descriptors by DMA via the communication channel; and writing each buffer descriptor retrieved in the step of retrieving, into the descriptor cache at a descriptor cache buffer descriptor address derived from the sum of the first starting buffer descriptor read address and a count of the number of descriptors in the set of buffer descriptors that have been retrieved previously in the step of retrieving.

2. A method according to claim 1, wherein the sum is a modulo sum.

3. A method according to claim 1, wherein the step of establishing a first starting buffer descriptor read address comprises the step of reading the first starting buffer descriptor read address from a queue read pointer field in a queue descriptor, further comprising the step of updating the read pointer field in the queue descriptor in conjunction with the step of retrieving the first set of buffer descriptors.

4. A method according to claim 1, wherein each buffer identified by the buffer descriptors in the first host memory descriptor queue is a host memory buffer containing data to be transmitted onto a network, further comprising the steps of:

reading a first one of the buffer descriptors from the first descriptor cache;

retrieving data from the buffer in host memory identified by the first buffer descriptor; and transmitting the data onto the network.

5. A method according to claim 4, wherein the step of establishing a first starting buffer descriptor read address comprises the step of reading the first starting buffer descriptor read address from a queue read pointer field in a queue descriptor, wherein the step of reading a first one of the buffer descriptors from the first descriptor cache comprises the step of reading the first buffer descriptor from a cache read pointer field in the queue descriptor, further comprising the step of updating the queue read pointer field in the queue descriptor in conjunction with the step of retrieving the first set of buffer descriptors, and further comprising the step of updating the cache read pointer field in the queue descriptor in conjunction with the step of reading a first one of the buffer descriptors from the first descriptor cache.

6. A method according to claim 1, wherein each buffer identified by the buffer descriptors in the first host memory descriptor queue is a host memory buffer available to receive data received from a network, further comprising the steps of:
receiving data from the network;
reading a first one of the buffer descriptors from the first descriptor cache; and
writing the data received from the network into the host memory buffer identified by the first buffer descriptor.

7. A method for retrieving via a communication channel, buffer descriptors from a host memory for use by a peripheral device, comprising the steps of:
providing a first descriptor cache that is accessible to the peripheral device without communication via the communication channel;
establishing a first starting buffer descriptor read address for a first host memory descriptor queue from which to initiate retrieval of a first set of at least one buffer descriptor;
retrieving the first set of buffer descriptors by DMA via the communication channel; and
writing the buffer descriptors retrieved in the step of retrieving the first set of buffer descriptors, into the first descriptor cache, at respective descriptor cache buffer descriptor addresses derived from the first starting buffer descriptor read address;
providing a second descriptor cache that is accessible to the peripheral device without communication via the communication channel;
establishing a second starting buffer descriptor read address for a second host memory descriptor queue from which to initiate retrieval of a second set of at least one buffer descriptor;
retrieving the second set of buffer descriptors by DMA via the communication channel; and
writing the buffer descriptors retrieved in the step of retrieving the second set of buffer descriptors, into the second descriptor cache, at respective descriptor cache buffer descriptor addresses derived from the second starting buffer descriptor read address.

8. A method according to claim 7, wherein the step of writing the buffer descriptors retrieved in the step of retrieving the first set of buffer descriptors, comprises the steps of:
writing each buffer descriptor retrieved in the step of retrieving the first set of buffer descriptors, into the first descriptor cache at a descriptor cache buffer descriptor address derived from the sum of the first starting buffer descriptor read address and a count of the number of descriptors in the set of buffer descriptors that have been retrieved previously in the step of retrieving the first set of buffer descriptors.

9. A method according to claim 8, wherein the sum is a modulo sum.

10. A method according to claim 8, wherein the step of establishing a first starting buffer descriptor read address comprises the step of reading the first starting buffer descriptor read address from a queue read pointer field in a queue descriptor,
further comprising the step of updating the read pointer field in the queue descriptor in conjunction with the step of retrieving the first set of buffer descriptors.

11. A method according to claim 7, wherein each buffer identified by the buffer descriptors in the first host memory descriptor queue is a host memory buffer containing data to be transmitted onto a network, further comprising the steps of:
reading a first one of the buffer descriptors from the first descriptor cache;
retrieving data from the buffer in host memory identified by the first buffer descriptor; and
transmitting the data onto the network.

12. A method according to claim 11, wherein the step of establishing a first starting buffer descriptor read address comprises the step of reading the first starting buffer descriptor read address from a queue read pointer field in a queue descriptor,
wherein the step of reading a first one of the buffer descriptors from the first descriptor cache comprises the step of reading the first buffer descriptor from a cache read pointer field in the queue descriptor,
further comprising the step of updating the queue read pointer field in the queue descriptor in conjunction with the step of retrieving the first set of buffer descriptors,
and further comprising the step of updating the cache read pointer field in the queue descriptor in conjunction with the step of reading a first one of the buffer descriptors from the first descriptor cache.

13. A method according to claim 7, wherein each buffer identified by the buffer descriptors in the first host memory descriptor queue is a host memory buffer available to receive data received from a network, further comprising the steps of:
receiving data from the network;
reading a first one of the buffer descriptors from the first descriptor cache; and
writing the data received from the network into the host memory buffer identified by the first buffer descriptor.

14. A method for retrieving via a communication channel, buffer descriptors from a host memory for use by a peripheral device, comprising the steps of:
providing a plurality of descriptor caches that are accessible to the peripheral device without communication via the communication channel, each of the descriptor caches corresponding to a respective one of a plurality of host memory descriptor queues;
providing a plurality of queue descriptors each corresponding to a respective one of the host memory descriptor queues, each particular one of the queue descriptors identifying a host memory read address from which to next initiate retrieval of a buffer descriptor from the host memory descriptor queue corresponding to the particular queue descriptor;
retrieving a first set of buffer descriptors by DMA via the communication channel, from a first selected one of the host memory descriptor queues, beginning at the host memory read address identified by the queue descriptor corresponding to the first selected host memory descriptor queue;
writing the buffer descriptors retrieved in the step of retrieving, into the descriptor cache corresponding to the selected host memory descriptor queue, at respective descriptor cache write addresses derived from the host memory read address identified by the queue descriptor corresponding to the first selected host memory descriptor queue; and
servicing one of the buffer descriptors in the descriptor cache corresponding to the selected host memory descriptor queue.

15. A method according to claim 14, further comprising the step of updating the identification of a host memory read address in the queue descriptor corresponding to the first selected host memory descriptor queues, in conjunction with the step of retrieving a first set of buffer descriptors.

16. A method according to claim 14, wherein each particular one of the queue descriptors further identifies a descriptor cache read address into the descriptor cache corresponding to the particular queue descriptor, the descriptor cache read address being an address from which to next obtain a buffer descriptor for use by the peripheral device, and wherein the step of servicing the buffer descriptors comprises the steps of:
   reading a buffer descriptor from the descriptor cache corresponding to a subject one of the host memory descriptor queues;
   using the host memory buffer identified by the buffer descriptor read in the step of reading; and
   updating the identification of a descriptor cache read address in the queue descriptor corresponding to the subject one of the host memory descriptor queues.

17. A method according to claim 14, wherein each particular one of the queue descriptors further includes a respective host memory write pointer identifying a respective host memory address at which the peripheral device believes a processor subsystem will next write a buffer descriptor into the host memory descriptor queue corresponding to the particular queue descriptor,
   further comprising the step of selecting the first selected one of the host memory descriptor queues in response to an updating of the host memory write pointer included in the queue descriptor corresponding to the first selected host memory descriptor queue.

18. A method according to claim 14, further comprising the step of selecting the first selected one of the host memory descriptor queues in response to a step of using the host memory buffer identified by a buffer descriptor read from the descriptor cache corresponding to the first selected host memory descriptor queue.

19. A method according to claim 14, further comprising the step of selecting the first selected one of the host memory descriptor queues in response to detection of a low water mark condition in the descriptor cache corresponding to the first selected host memory descriptor queue.

20. A method according to claim 14, wherein each subject one of the host memory descriptor queues has associated therewith a queue ID, the queue ID identifying both the queue descriptor corresponding to the subject host memory descriptor queue and the descriptor cache corresponding to the subject host memory descriptor queue.

21. A peripheral device for use with a host memory in communication with the peripheral device via a communication channel, the host memory including a plurality of host memory descriptor queues, comprising:
   a plurality of descriptor caches that are accessible to the peripheral device without communication via the communication channel, each of the descriptor caches corresponding to a respective one of the host memory descriptor queues; and
   a plurality of queue descriptors each corresponding to a respective one of the host memory descriptor queues,
   wherein each particular one of the queue descriptors includes a respective pointer that identifies both a host memory read address from which to next initiate retrieval of a buffer descriptor from the host memory descriptor queue corresponding to the particular queue descriptor, and a descriptor cache write address at which to next write a buffer descriptor retrieved from the host memory descriptor queue corresponding to the particular queue descriptor.

22. A device according to claim 21, further comprising a first DMA engine coupled to the communication channel and programmable to retrieve buffer descriptors from host memory beginning at the host memory address identified by the pointer in a selected one of the queue descriptors, and to write retrieved buffer descriptors into the descriptor cache corresponding to the selected queue descriptor, at addresses derived from the pointer in the selected queue descriptor.

23. A device according to claim 22, further comprising a second DMA engine coupled to the communication channel and programmable to transfer data via the communication channel between a host memory buffer identified by a buffer descriptor in one of the descriptor caches, and storage on the peripheral device.

24. A device according to claim 23, for use further with a network, further comprising logic which transmits outgoing data onto the network from the storage, and writes into the storage, data incoming from the network.

* * * * *